United States Patent
Jacob et al.

(10) Patent No.: US 9,606,137 B2
(45) Date of Patent: Mar. 28, 2017

(54) ENHANCEMENTS FOR DIFFERENTIAL-PRESSURE-DRIVEN FLUID FLOWS

(71) Applicant: Rosemount Aerospace Inc., Burnsville, MN (US)

(72) Inventors: Robin Jacob, Karnataka (IN); Guru Prasad Mahapatra, Karnataka (IN); Paul Robert Johnson, Prior Lake, MN (US)

(73) Assignee: Rosemount Aerospace Inc., Burnsville, MN (US)

( * ) Notice: Subject to any disclaimer, the term of this patent is extended or adjusted under 35 U.S.C. 154(b) by 0 days.

(21) Appl. No.: 14/742,261

(22) Filed: Jun. 17, 2015

(65) Prior Publication Data
US 2016/0370400 A1    Dec. 22, 2016

(51) Int. Cl.
*G01F 1/46* (2006.01)
*G01P 5/165* (2006.01)

(52) U.S. Cl.
CPC ............... *G01P 5/165* (2013.01); *G01F 1/46* (2013.01)

(58) Field of Classification Search
CPC .................................. G01F 1/46; G01L 13/02
USPC ................... 73/861.66, 861.65, 736
See application file for complete search history.

(56) References Cited

U.S. PATENT DOCUMENTS

| | | |
|---|---|---|
| 2,204,367 A | 6/1940 | Kollsman |
| 2,381,327 A | 8/1945 | Woodman et al. |
| 3,267,992 A | 8/1966 | Werner et al. |
| 3,355,946 A | 12/1967 | Lazell |
| 3,383,916 A | 5/1968 | Werner |
| 5,046,360 A | 9/1991 | Hedberg |
| 5,062,869 A | 11/1991 | Hagen |
| 5,313,980 A * | 5/1994 | Carlson ............... G05D 23/023 137/557 |
| 5,466,067 A | 11/1995 | Hagen et al. |
| 5,483,839 A * | 1/1996 | Meunier ................ G01P 5/165 264/271.1 |
| 5,628,565 A | 5/1997 | Hagen et al. |
| 5,731,507 A | 3/1998 | Hagen et al. |
| 6,012,331 A | 1/2000 | Menzies et al. |
| 6,591,696 B2 | 7/2003 | Bachinski |

(Continued)

FOREIGN PATENT DOCUMENTS

EP        0716307 A1    6/1996

OTHER PUBLICATIONS

Extended European Search Report for EP Application No. 16175056.7, dated Aug. 2, 2016, 8 pages.

*Primary Examiner* — Jewel V Thompson
(74) *Attorney, Agent, or Firm* — Kinney & Lange, P.A.

(57) ABSTRACT

A pitot tube includes a wall that extends longitudinally along an axis. The wall defines an inlet aperture at a longitudinal end of the wall, an outlet aperture opposite the inlet aperture, an interior cavity extending from the inlet aperture to an outlet aperture, a passage extending through and perpendicular to the wall having an outlet along an exterior surface of the wall, and an augmenting feature configured to reduce a static pressure at the outlet of the passage. In another embodiment, a wall defines a passage and an augmenting feature that modifies a flow direction of fluid flowing across an outlet of the passage such that a static pressure of the fluid at the outlet is reduced relative to the wall without the augmenting feature.

20 Claims, 6 Drawing Sheets

(56) References Cited

U.S. PATENT DOCUMENTS

| | | | |
|---|---|---|---|
| 6,892,584 B2 * | 5/2005 | Gilkison | ............... G01P 5/165 73/1.29 |
| 7,716,980 B1 | 5/2010 | Colten et al. | |
| 7,752,908 B2 | 7/2010 | Igarashi et al. | |
| 2013/0145862 A1 | 6/2013 | Leblond et al. | |
| 2014/0116154 A1 | 5/2014 | Seidel et al. | |
| 2014/0290383 A1 | 10/2014 | Ashton | |

* cited by examiner

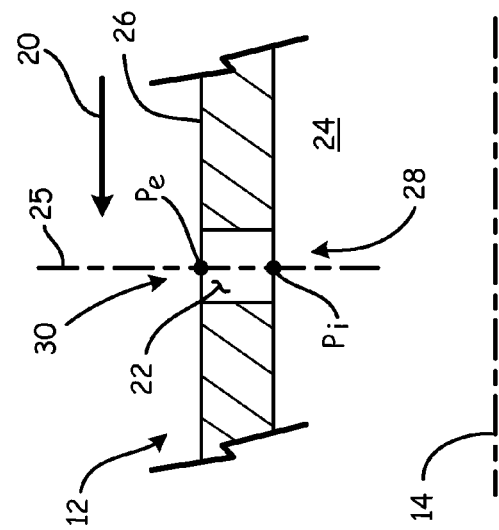
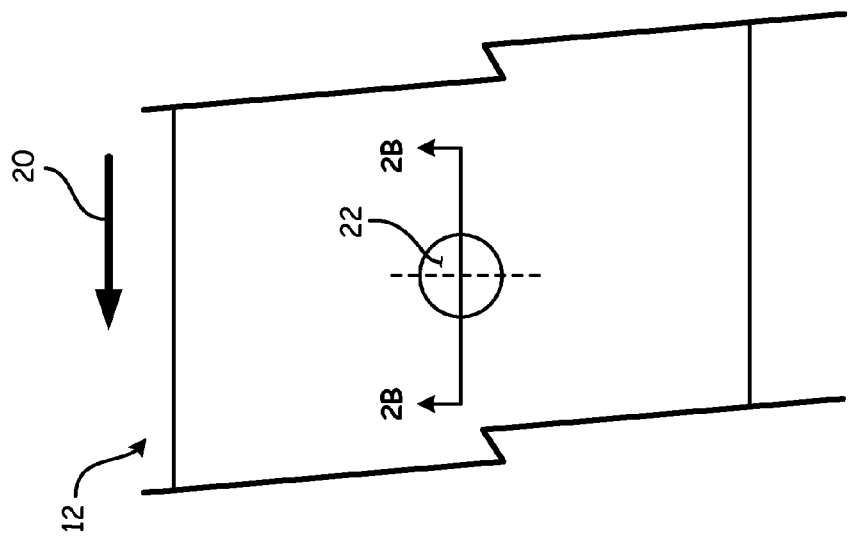
Fig. 2B
Fig. 2A

ENHANCEMENTS FOR DIFFERENTIAL-PRESSURE-DRIVEN FLUID FLOWS

BACKGROUND

The present invention relates generally to enhancing flow through a passage driven by differential pressure and more particularly, to enhancing moisture removal from pitot tubes or to enhancing boundary layer flow removal from total air temperature probes (TAT probes) in which there are practical limitations to passage quantity and size.

Pitot tubes are commonly used to measure stagnation pressure of a fluid. When used in combination with static pressure measurements, pitot tubes are used to determine dynamic pressure which is proportional to the velocity of the fluid. In order to conduct the stagnation pressure measurement, pitot tubes are typically formed from a long, generally cylindrical body that extends upstream into the fluid to isolate an upstream end of the pitot tube from flow disturbances. The upstream end includes an aperture communicating with an interior cavity of the pitot tube. Pressure transducers that communicate with the interior cavity are positioned to measure the stagnation pressure or, in other words, the static pressure of a fluid at a stagnation point (i.e. a point in which the fluid velocity equals zero).

In the context of an aircraft, pitot tubes measure the stagnation pressure of the aircraft moving through an airstream and, when used with static pressure measurements located elsewhere on the aircraft, are used to determine the air speed of the aircraft. Accuracy of the pitot tube measurement depends on maintaining an unobstructed cavity between the pitot tube inlet aperture and the pressure transducer location. However, aircraft experience a myriad of environmental conditions during flight including precipitation, moisture, and freezing temperatures less than $-40°$ C. ($-40°$ F.). As such, moisture and ice particles can accumulate within the pitot tube. To preserve the functionality of the pitot tube, heaters and drain holes are included to remove the moisture and ice particles from the pitot tube. The mass flow rate draining from the pitot tube is related to a differential pressure between the pitot tube cavity and the external static pressure as well as the drain hole diameter and length. In general, larger drain hole diameters permit more mass flow rate through the drain hole than smaller diameters.

TAT probes measure a fluid temperature at a stagnation point. Generally, TAT probes ingest fluid through an inlet and decrease the fluid velocity downstream from the inlet by passing the fluid through an expansion section. Once fluid velocity is reduced, a sensing element measures the temperature at a stagnation point within the probe. However, after the fluid enters the TAT probe, a boundary layer develops near interior walls of the probe. Like the pitot tube, TAT probes are heated to reduce icing within the probe. Heating the probe increases a temperature of the boundary layer flow near the walls. Measurement error is caused by boundary layer flow when it is allowed to interact with the sensing element. Therefore, TAT probes often include passages extending through the wall to remove the boundary layer flow. Like the pitot tube drain holes, flow through these passages is driven by a differential pressure. The inlet static pressure of the passage is generally greater than the outlet static pressure of the passage because fluid entering the TAT probe passes through an expansion, thereby increasing the static pressure of the fluid within the TAT probe.

However, some pitot tube and TAT probe applications have passages for which a maximum diameter is limited for practical reasons (e.g., the size of internal heating components, constraints limiting the quantity of passages). Therefore, pitot tubes and TAT probes require passages that have one or more features to improve the mass flow rate therethrough.

SUMMARY

A pitot tube includes a wall that extends longitudinally along an axis. The wall defines an inlet aperture at a longitudinal end of the wall, an outlet aperture opposite the inlet aperture, an interior cavity extending from the inlet aperture to an outlet aperture, a passage extending through and perpendicular to the wall having an outlet along an exterior surface of the wall, and an augmenting feature configured to reduce a static pressure at the outlet of the passage. The inlet aperture places the interior cavity in communication with a space exterior to the wall.

An apparatus includes a wall extending in a longitudinal direction to partition an interior volume from an exterior space. The wall defines a passage extending through and perpendicular to the wall and an augmenting feature. The passage has an outlet along an exterior surface of the wall. The augmenting feature modifies a flow direction of fluid flowing across the outlet of the passage such that a static pressure of the fluid at the outlet is reduced relative to the wall without the augmenting feature.

BRIEF DESCRIPTION OF THE DRAWINGS

FIG. 2A is a partial side view of the pitot tube showing one of the passages from FIG. 1.

FIG. 2B is a cross-sectional view of the passage in FIG. 2A.

DETAILED DESCRIPTION

Figure 1:
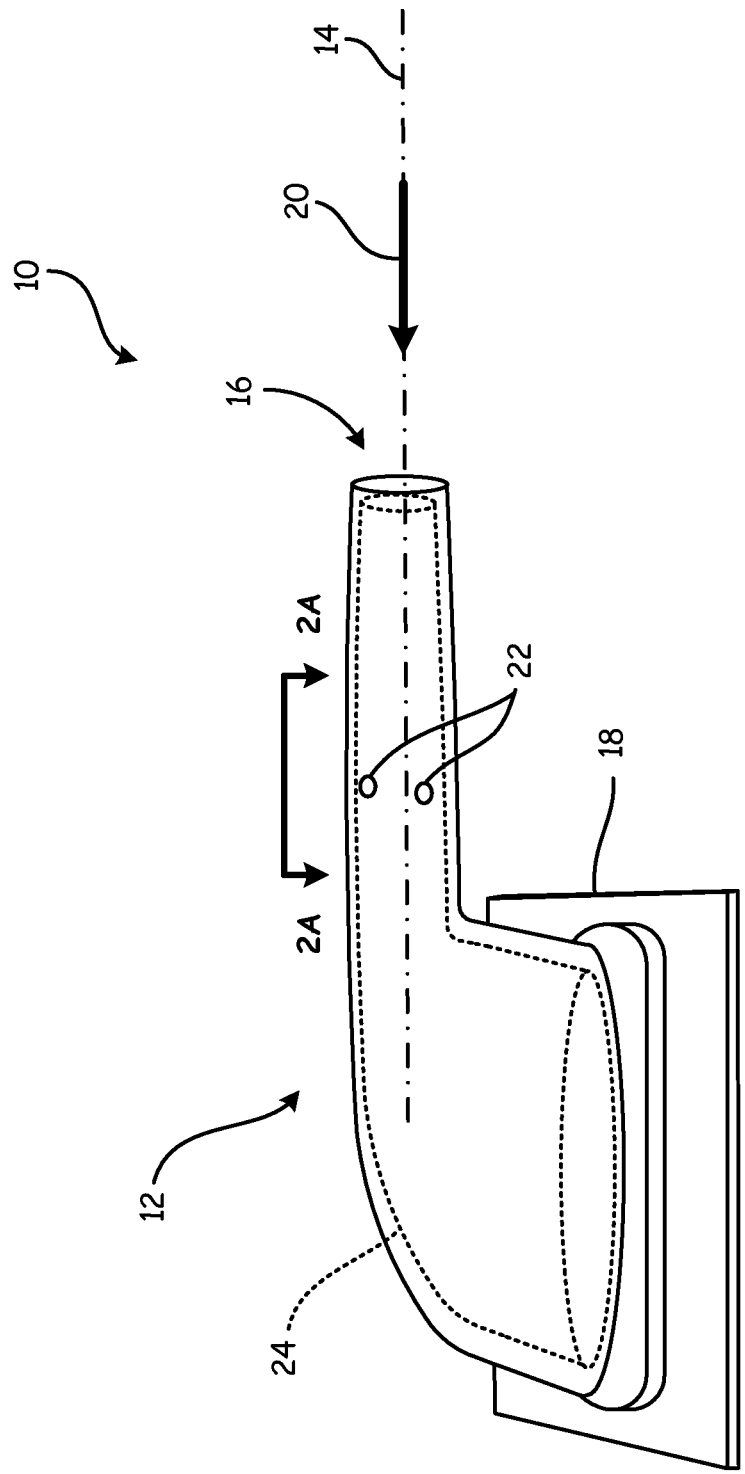
FIG. 1 is an isometric view of a pitot tube showing passages for removing moisture from within the pitot tube.

FIG. 1 is an isometric view of pitot tube 10. Pitot tube 10 includes wall 12 that extends along longitudinal axis 14 to inlet aperture 16 and extends transverse relative to axis 14 to base 18. Wall 12 has a contoured exterior profile for reducing drag. Base 18 permits pitot tube 10 to be joined to a structure (not shown), such as an aircraft exterior, to facilitate stagnation pressure measurements of a fluid flowing through aperture 16 and along wall 12 in a direction substantially parallel with longitudinal axis 14 as indicated by arrow 20. Wall 12 defines at least one passage 22 that allows condensed fluid or melted ice to discharge from interior volume 24 (hidden in FIG. 1) of pitot tube 10.

Moisture, liquid, and ice can accumulate within interior volume 24 by entering through inlet aperture 16. Accumulation of moisture and liquid that freezes and/or ice particles within volume 24 inhibits stagnation pressure measurements by obstructing interior volume 24. A heater (not shown) within pitot tube 10 melts ice within interior volume 24 so that liquid discharges through passages 22. Because fluid flowing into interior volume 24 stagnates, internal pressure Pi is greater than external pressure Pe when pitot tube 10 is placed in a fluid stream (see FIG. 2B) having a velocity relative to pitot tube 10. The differential pressure between internal pressure Pi and external pressure Pe drives liquid through passage 22 at a mass flow rate.

The number of passages 22 on wall 12 depends on the mass flow rate of liquid to be removed from internal cavity 24, the expected internal pressure Pi and external pressure Pe conditions, and passage 22 geometry (i.e., cross-section and length). As such, one or more passages 22 can be located along wall 12 to remove the appropriate mass flow rate of liquid.

In some embodiments, passage 22 is located along a portion of wall 12 that is aligned with gravity when pitot tube 10 is installed. This allows gravity to assist the flow of fluid through passage 22. For example, if pitot tube 10 is installed along a bottom surface of an aircraft, passage 22 can be located along a downward facing portion of wall 12 when the aircraft is orientated in level flight. Similarly, if pitot tube 10 is installed along a side surface of an aircraft, passage 22 can be located along a downward facing portion of wall 12. However, passage 22 of a side-mounted pitot tube 10 will be spaced circumferentially along wall 12 from passage 22 of a bottom-mounted pitot tube 10.

Moreover, multiple passages 22 can be used to form an array. However, as the number of passages 22 increase, internal pressure Pi decreases because passages 22 allow stagnated fluid to escape. In some embodiments, two passages 22 are used, which provide for redundant drainage paths while maintaining higher internal pressure Pi relative to pitot tubes 10 with greater numbers of passages 22.

FIG. 2A is a partial side view of pitot tube 10 taken along line 2A-2A in FIG. 1 showing passage 22. Passage 22 has a circular cross-section, although other cross-sections could be used. Fluid flows across wall 12 of pitot tube 10 in the direction indicated by arrow 20.

FIG. 2B is a cross-sectional view of passage 22 taken along line 2B-2B in FIG. 2A. Passage 22 extends through wall 12 along central axis 25 from internal cavity 24 to external surface 26 of wall 12. Passage 22 is substantially perpendicular to exterior surface 26 of wall 12 to minimize flow-related pressure losses. In other embodiments, passage 22 can form an oblique angle with exterior surface 26. Passage 22 communicates with internal cavity 24 at inlet 28 and with the exterior of pitot tube 10 at outlet 30. Liquid that accumulates within cavity 24 is driven through passage 22 by the differential pressure between internal pressure Pi and external pressure Pe.

Figure 3A:
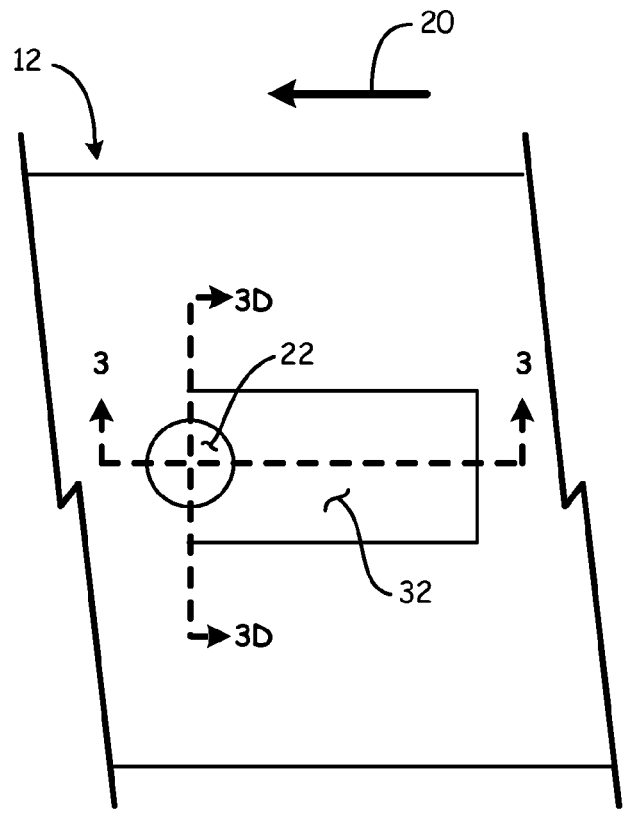
FIG. 3A is a partial side view of a pitot tube showing a passage configured with a wedge-shaped augmenter.

FIG. 3A is a partial side view of wall 12 in which passage 22 has augmenting feature 32a or 32b. Fluid flowing along wall 12 in the direction indicated by arrow 20 is modified by augmenting feature 32 to reduce external pressure Pe at outlet 30 of passage 22. The width of augmenting feature 32 in a direction transverse to longitudinal axis 14 (not shown in FIG. 3A) is greater than a diameter of passage 22. In some embodiments, the width of augmenting feature 32 is equal to or greater than three times the diameter of passage 22. Augmenting feature 32 has a length in a direction parallel to longitudinal axis 14 (not shown in FIG. 3A). In some embodiments, the length of feature 32 is greater than or equal to five times the diameter of passage 22.

Figure 3B:
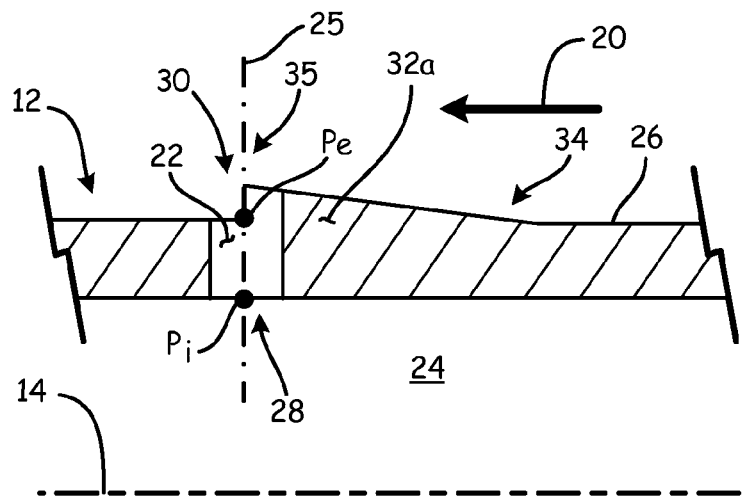
FIG. 3B is a cross-sectional view of the passage in FIG. 3A in which the wedge-shaped augmenter has a linear profile.
Figure 3C:
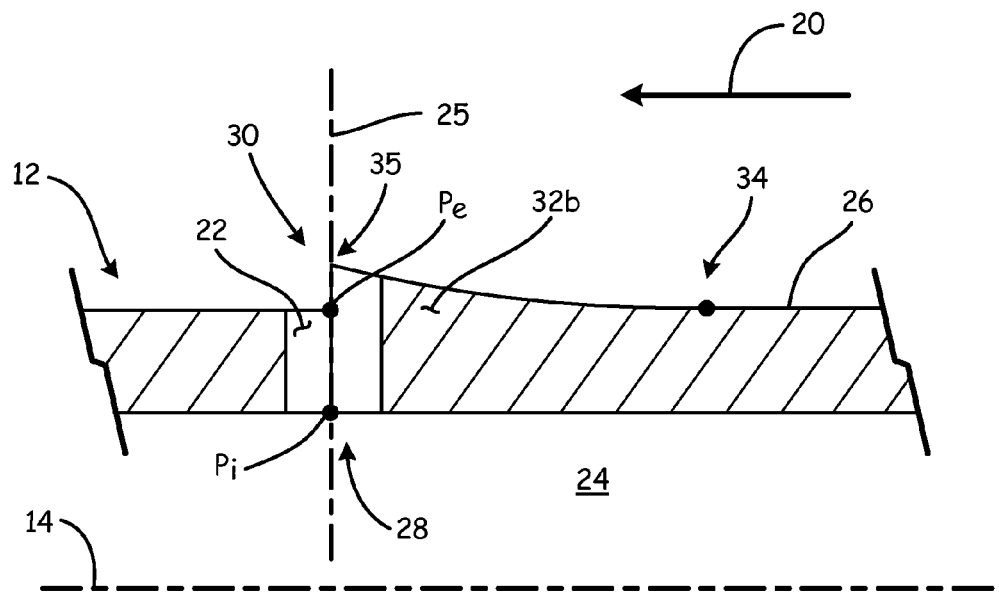
FIG. 3C is a cross-sectional view of the passage in FIG. 3A in which the wedge-shaped augmenter has a curved profile.

FIGS. 3B and 3C are cross-sectional views of passage 22 that has augmenting features 32a and 32b, respectively, taken along line 3-3 in FIG. 3A. Previously described reference numbers refer to like components in FIG. 3B. Augmenting features 32a and 32b have a height parallel to axis 25 of passage 22. The height of augmenting features 32a and 32b increases from upstream end 34 of features 32a and 32b located farthest from passage 22 to downstream end 35 adjacent to passage 22. In some embodiments, the maximum height of features 32a and 32b is greater than or equal to one fourth the diameter of passage 22. The maximum height of features 32a and 32b can be between upstream end 34 and downstream end 35. In some embodiments, the maximum heights of features 32a and 32b are aligned with axis 25 of passage 22.

In FIG. 3B, augmenting feature 32a is a protrusion having a triangular cross-section along a longitudinal direction characterized by a linear height profile between ends 34 and 35. With a linear height profile, augmenting feature 32a has a wedge-shaped cross-section. In FIG. 3C, augmenting feature 32b has a curved cross-section characterized by a polynomial function height profile between ends 34 and 35 (e.g., a second order polynomial function). Additionally, augmenting feature 32b can be tangent to surface 26 at upstream end 34 as shown in FIG. 3C. In each case, flow of fluid along exterior surface 26 of wall 12 from upstream end 34 to downstream end 35 modifies a direction of flow of the fluid, causing separation of fluid flow downstream from end 35 of augmenting features 32a and 32b. In the wake of features 32a and 32b, the flow separation causes eddies that reduce external pressure Pe at outlet 30 of passage 22. Thus, the differential pressure between internal pressure Pi and external pressure Pe is greater than for a passage without augmenting features 32a or 32b. Increased differential pressure increases mass flow through passage 22.

Figure 3D:
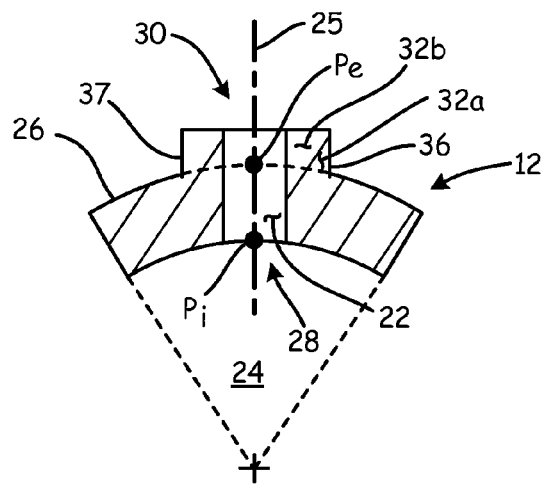
FIG. 3D is a cross-sectional view of the passage in FIG. 3A showing side profiles of the wedge-shaped augmenter.

FIG. 3D is a cross-sectional view of passage 22 and augmenting features 32a and 32b taken along line 3D-3D in FIG. 3A. Previously described reference numbers refer to like components in FIGS. 3A, 3B, and 3C. In particular, FIG. 3D shows side walls 36 and 37 of augmenting features 32a and 32b. In some embodiments, walls 36 and 37 extend away from external surface 26 in a direction that is substantially parallel to axis 25 of passage 22. In other embodiments, walls 36 and 37 can form oblique angles with axis 25 or be tangent to external surface 26.

Figure 4A:
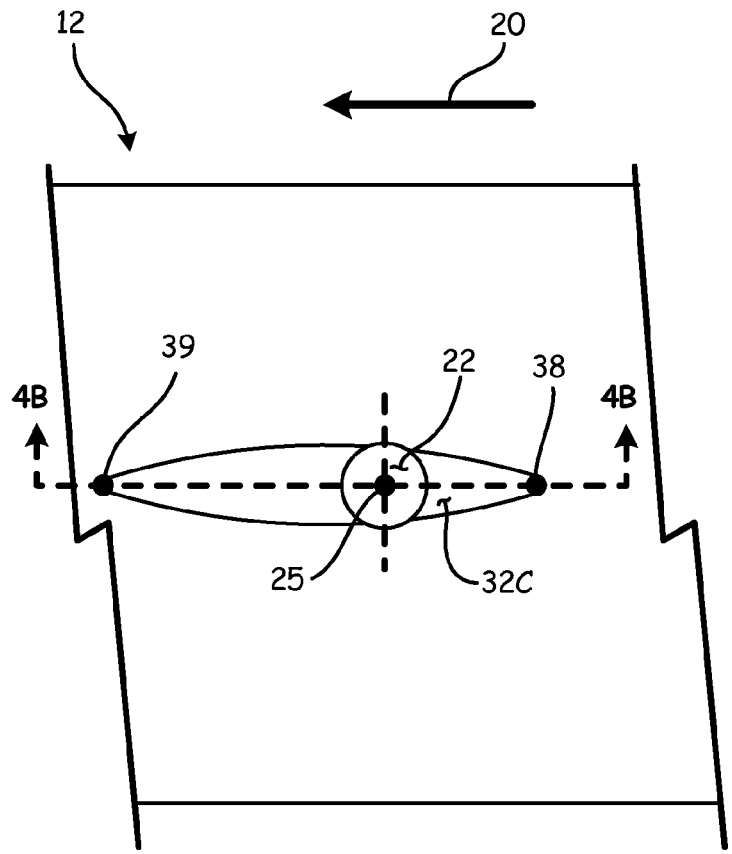
FIG. 4A is a partial side view of a pitot tube showing a passage configured with a groove augmenter.

FIG. 4A is a partial side view of wall 12 in which passage 22 has augmenting feature 32c. Augmenting feature 32c is a groove defined by wall 12. Feature 32c extends in a direction parallel to longitudinal axis 14 (not shown in FIG. 4A) and intersects axis 25 of passage 22. In some embodiments, feature 32c is symmetric about line 4B-4B as shown in FIG. 4A. Augmenting feature 32c is a contoured groove that extends in a lengthwise direction from upstream end 38 to a downstream end 39 that is generally aligned with longitudinal axis 14. End 38 is closer to inlet aperture 16 (not shown in FIG. 4A) than end 39. In the embodiment show in FIG. 4A, the distance between end 38 and axis 25 is less than a distance between end 39 and axis 25. Thus, feature 32c extends from passage 22 an upstream distance to end 38 that is less than a downstream distance to end 39. In other embodiments, the distance between end 38 and axis 25 is greater than or equal to a distance between end 39 and axis 25. A width of feature 32c is defined in a transverse direction with respect to axis 14 and in a generally circumferential direction about wall 12. In some embodiments, a maximum width of feature 32c is less than a diameter of passage 22. In other embodiments, the maximum width of feature 32c coincides with passage 22. Furthermore, augmenting feature 32c has a generally elliptical contour as viewed in FIG. 4A.

Figure 4B:
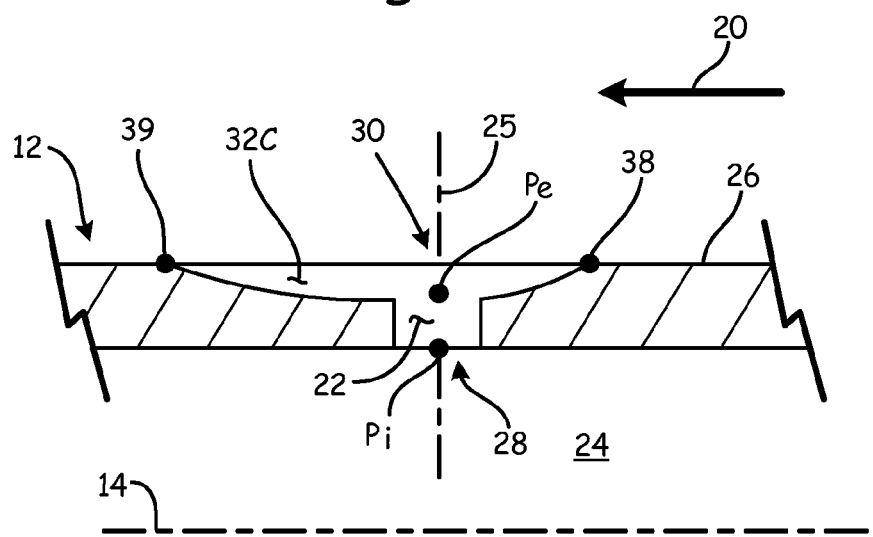
FIG. 4B a cross-sectional view of the passage in FIG. 4A configured with a groove augmenter.

FIG. 4B is a cross-sectional view of passage 22 and augmenting feature 32c taken along line 4B-4B in FIG. 4A. Augmenting feature 32c has a depth that is parallel to axis 25 (i.e., a through-thickness direction of wall 12). In some embodiments, a maximum depth of augmenting feature 32c is greater than or equal to one fourth times the diameter of passage 22. Additionally, the maximum depth of augmenting feature 32c can coincide with passage 22, occurring at an edge of or within passage 22. Feature 32c is contoured such that fluid flow is drawn therein to increase a local velocity of the fluid at outlet 30 of passage 22. Increased fluid velocity relative to the velocity of fluid flowing along exterior surface 26 reduces external pressure Pe relative to a passage without augmenting feature 32c. Thus, the differential pressure between internal pressure Pi and external pressure Pe is greater than for a passage without augmenting feature 32c. As described previously, increased differential pressure increases mass flow through passage 22.

Figure 5B:
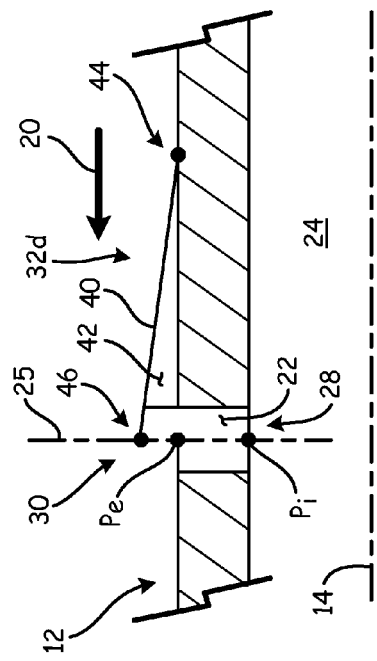
FIG. 5B is a cross-sectional view of the passage in FIG. 5A configured with wedge-shaped and groove augmenters.
Figure 5C:
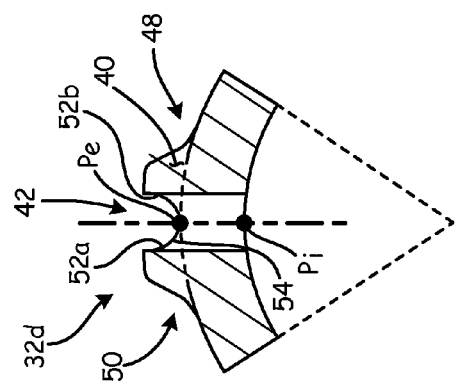
FIG. 5C is a cross-sectional view of the passage in FIG. 5A showing side profiles of the wedge-shaped and groove augmenters.
Figure 5A:
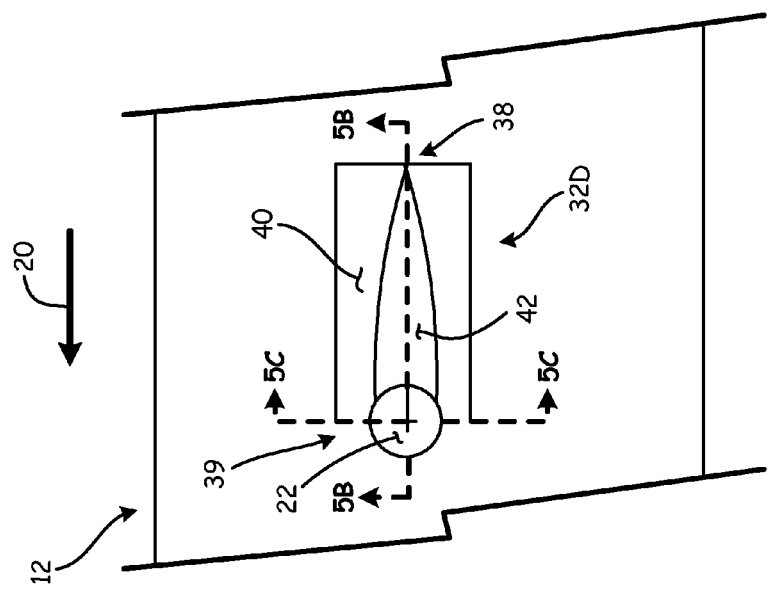
FIG. 5A is a partial side view of a pitot tube showing a passage configured with wedge-shaped and groove augmenters.

FIG. 5A is a partial side view of wall 12 in which passage 22 has augmenting feature 32d. Augmenting feature 32d includes wedge 40 and groove 42. Wedge 40 is a protrusion that is substantially similar to augmenting feature 32a or 32b as previously described except for the addition of groove 42. Groove 42 is substantially similar to an upstream portion of augmenting feature 32c from axis 25 to upstream end 38 (see FIGS. 4A-B). Augmenting feature 32d combines the benefits of the wedge-shaped and groove features to both cause flow separation and to accelerate fluid flow at outlet 30 of passage 22.

In FIG. 5B, wedge 40 has a triangular cross-section along a longitudinal direction characterized by a linear height profile between ends 44 and 46. With a linear height profile, augmenting feature 32d has a wedge-shaped cross-section. Alternatively, wedge 40 can have a curved cross-section in accordance with FIG. 3C and characterized by a polynomial function height profile between ends 44 and 46 (e.g., a second order polynomial function). In each case, fluid flows along exterior surface 26 of wall 12 from upstream end 44 to downstream end 46, thereby modifying a direction of flow of the fluid. Augmenting feature 32d causes separation of fluid flow downstream from end 46. In the wake of feature 32d, the flow separation causes eddies that reduce external pressure Pe at outlet 30 of passage 22. Thus, the differential pressure between internal pressure Pi and external pressure Pe is greater than for a passage without augmenting feature 32d. Increased differential pressure increases mass flow through passage 22. Additionally, wedge 40 includes groove 42 that is substantially similar to augmenting feature 32c in FIGS. 4A-B. However, instead of extending a distance into wall 12, groove 42 extends into wedge 40 to perform a similar flow accelerating function.

FIG. 5C is a cross-sectional view of passage 22 and augmenting feature 32d. In particular, FIG. 5C shows side walls 48 and 50 of augmenting feature 32d. Walls 48 and 50 extend from exterior surface 26 at an oblique angle with respect to axis 25. In some embodiments, walls 48 and 50 have radii along edges extending in the longitudinal direction. Blending augmenting feature 32d in this way reduces drag caused by the addition of augmenting feature 32d. Similar enhancements can be used on side walls of augmenting features 32a, 32b, and 32c, previously described.

Additionally, groove 42 has side faces 52a and 52b and end face 54. End face 54 joins side face 52a to side face 52b along a radially inner side of groove 42. End face 54 can be contoured such that end face 54 is tangent to side faces 52a and 52b. Thus, in some embodiments, end face 54 forms a fillet between side faces 52a and 52b.

Although the preceding discussion described an embodiment of the present invention as applied to pitot tube 10 (see FIG. 1), the present invention can be used in other devices to augment flow through a passage that is at least partially driven by differential pressure between an inlet and an outlet of the passage. For example, the present invention can be used in a TAT probe. Even though passages extending through TAT probes are generally used to remove boundary layer flows, flow through the passages is driven by a differential pressure between an interior cavity of the probe and an exterior of the probe. As such, any of the previously-described augmenting features can be applied to the passages of the TAT probe.

Discussion of Possible Embodiments

The following are non-exclusive descriptions of possible embodiments of the present invention.

A pitot tube includes a wall that extends longitudinally along an axis. The wall defines an inlet aperture at a longitudinal end of the wall, an outlet aperture opposite the inlet aperture, an interior cavity extending from the inlet aperture to an outlet aperture, a passage extending through and perpendicular to the wall having an outlet along an exterior surface of the wall, and an augmenting feature configured to reduce a static pressure at the outlet of the passage. The inlet aperture places the interior cavity in communication with a space exterior to the wall.

The pitot tube of the preceding paragraph can optionally include, additionally and/or alternatively, any one or more of the following features, configurations and/or additional components:

A further embodiment of the foregoing pitot tube, wherein the augmenting feature can be a protrusion having a wedge-shaped longitudinal cross-section.

A further embodiment of any of the foregoing pitot tubes, wherein a radial thickness of the protrusion can increase from an upstream end of the protrusion closed to the inlet aperture to a longitudinal location between the upstream end and a central axis of the passage.

A further embodiment of any of the foregoing pitot tubes, wherein a maximum radial thickness of the protrusion can be coincident with the central axis of the passage.

A further embodiment of any of the foregoing pitot tubes, wherein the protrusion can have a radial thickness defined by a linear profile or a second order polynomial profile.

A further embodiment of any of the foregoing pitot tubes, wherein the protrusion can have a length in the longitudinal direction at least five times a diameter of the passage, a width transverse to the longitudinal direction at least three times the diameter of the passage, and a maximum radial thickness at least one fourth the diameter of the passage.

A further embodiment of any of the foregoing pitot tubes, wherein the augmenting feature can be a groove extending substantially parallel to the longitudinal direction an intersecting a central axis of the drain passage, wherein the groove can extend a first length from the passage to an upstream end towards the inlet aperture and a second length from the passage to a downstream end opposite the upstream end.

A further embodiment of any of the foregoing pitot tubes, wherein the first length is different than the second length.

A further embodiment of any of the foregoing pitot tubes, wherein the second length can be greater than or equal to the first length.

A further embodiment of any of the foregoing pitot tubes, wherein the groove can have a width transverse to the longitudinal direction that can be less than a diameter of the passage.

A further embodiment of any of the foregoing pitot tubes, wherein the augmenting feature can be a protrusion having a wedge-shaped longitudinal cross-section in which the protrusion can have groove extending substantially parallel to the longitudinal direction.

A further embodiment of any of the foregoing pitot tubes, wherein the groove can extend from the passage to a surface that extends longitudinally.

A further embodiment of any of the foregoing pitot tubes, wherein the groove can have an end face joining a first side face to a second side face, and wherein the end face forms a fillet between the first and second side faces.

An apparatus includes a wall extending in a longitudinal direction to partition an interior volume from an exterior space. The wall defines a passage extending through and perpendicular to the wall and an augmenting feature. The passage has an outlet along an exterior surface of the wall. The augmenting feature directs a fluid across the outlet of the passage such that a static pressure of the fluid at the outlet is reduced.

The apparatus of the preceding paragraph can optionally include, additionally and/or alternatively, any one or more of the following features, configurations and/or additional components:

A further embodiment of the apparatus, wherein the augmenting feature can be a protrusion having a wedge-shaped longitudinal cross-section.

A further embodiment of any of the apparatuses, wherein a radial thickness of the protrusion can increase from an upstream end of the protrusion farthest from the passage to a longitudinal location between the upstream end and a central axis of the passage.

A further embodiment of any of the apparatuses, wherein a maximum radial thickness of the protrusion can be coincident with the central axis of the drain passage.

A further embodiment of any of the apparatuses, wherein the augmenting feature can be a groove extending substantially parallel to the longitudinal direction and intersecting a central axis of the passage, and wherein the groove can extends a first length from the passage to an upstream end towards the inlet aperture and a second length from the passage to a downstream end opposite the upstream end.

A further embodiment of any of the apparatuses, and wherein the second length can be greater than or equal to the first length.

A further embodiment of any of the apparatuses, wherein the augmenting feature can be a protrusion having a wedge-shaped longitudinal cross-section in which the protrusion can have a groove extending substantially parallel to the longitudinal direction.

While the invention has been described with reference to an exemplary embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the scope of the appended claims.

The invention claimed is:

1. A pitot tube comprising:
 a wall extending longitudinally along an axis, wherein the wall defines:
  an inlet aperture at a longitudinal end of the wall;
  an outlet aperture opposite the inlet aperture;
  an interior cavity extending from the inlet aperture to an outlet aperture, wherein the inlet aperture places the interior cavity in communication with a space exterior to the wall;
  a passage extending through and perpendicular to the wall having an outlet along an exterior surface of the wall; and
  an augmenting feature configured to reduce a static pressure at the outlet of the passage.

2. The pitot tube of claim 1, wherein the augmenting feature is a protrusion having a wedge-shaped longitudinal cross-section.

3. The pitot tube of claim 2, wherein a radial thickness of the protrusion increases from an upstream end of the protrusion closest to the inlet aperture to a longitudinal location between the upstream end and a central axis of the passage.

4. The pitot tube of claim 3, wherein a maximum radial thickness of the protrusion is coincident with the central axis of the passage.

5. The pitot tube of claim 2, wherein the protrusion has a radial thickness defined by a linear profile or a second order polynomial profile.

6. The pitot tube of claim 2, wherein the protrusion has a length in the longitudinal direction at least 5 times a diameter of the passage, a width transverse to the longitudinal direction at least 3 times the diameter of the passage, and a maximum radial thickness at least 0.25 times the diameter of the passage.

7. The pitot tube of claim 1, wherein the augmenting feature is a groove extending substantially parallel to the longitudinal direction and intersecting a central axis of the passage, and wherein the groove extends a first length from the passage to an upstream end towards the inlet aperture and a second length from the passage to a downstream end opposite the upstream end.

8. The pitot tube of claim 7, wherein the first length is different than the second length.

9. The pitot tube of claim 7, wherein the second length is greater than or equal to the first length.

10. The pitot tube of claim 7, wherein the groove has a width transverse to the longitudinal direction that is less than or equal to a diameter of the passage.

11. The pitot tube of claim 1, wherein the augmenting feature is a protrusion having a wedge-shaped longitudinal cross-section in which the protrusion has a groove extending substantially parallel to the longitudinal direction.

12. The pitot tube of claim 11, where the groove extends from the passage to a surface of the protrusion that extends longitudinally.

13. The pitot tube of claim 11, wherein the groove has an end face joining a first side face to a second side face, and wherein the end face forms a fillet between the first and second side faces.

14. An apparatus comprising:
a wall extending in a longitudinal direction to partition an interior volume from an exterior space, wherein the wall defines:
  a passage extending through and perpendicular to the wall, wherein the passage has an outlet along an exterior surface of the wall; and
  an augmenting feature that directs a fluid across the outlet of the passage such that a static pressure of the fluid at the outlet is reduced.

15. The apparatus of claim 14, wherein the augmenting feature is a protrusion having a wedge-shaped longitudinal cross-section.

16. The apparatus of claim 15, wherein a radial thickness of the protrusion increases from an upstream end of the protrusion farthest from the passage to a longitudinal location between the upstream end and a central axis of the passage.

17. The apparatus of claim 16, wherein a maximum radial thickness of the protrusion is coincident with the central axis of the passage.

18. The apparatus of claim 14, wherein the augmenting feature is a groove extending substantially parallel to the longitudinal direction and intersecting a central axis of the passage, and wherein the groove extends a first length from the passage to an upstream end towards the inlet aperture and a second length from the passage to a downstream end opposite the upstream end.

19. The apparatus of claim 18, wherein the second length is greater than or equal to the first length.

20. The apparatus of claim 14, wherein the augmenting feature is a protrusion having a wedge-shaped longitudinal cross-section in which the protrusion has a groove extending substantially parallel to the longitudinal direction.

\* \* \* \* \*